US011842381B1

(12) United States Patent
Jones et al.

(10) Patent No.: US 11,842,381 B1
(45) Date of Patent: Dec. 12, 2023

(54) SYSTEMS AND METHODS FOR BIDIRECTIONAL ECOMMERCE PARITY

(71) Applicant: Auctane, LLC, Austin, TX (US)

(72) Inventors: James Nathan Jones, Austin, TX (US); Thomas E. Warmbrodt, Fredericksburg, TX (US); Jordan John Bolton, Austin, TX (US)

(73) Assignee: Auctane, LLC, Austin, TX (US)

( * ) Notice: Subject to any disclaimer, the term of this patent is extended or adjusted under 35 U.S.C. 154(b) by 454 days.

(21) Appl. No.: 16/861,468

(22) Filed: Apr. 29, 2020

(51) Int. Cl.
*G06F 16/23* (2019.01)
*G06Q 30/0601* (2023.01)
*G06Q 50/28* (2012.01)

(52) U.S. Cl.
CPC ..... *G06Q 30/0635* (2013.01); *G06F 16/2365* (2019.01); *G06F 16/2379* (2019.01); *G06Q 30/0605* (2013.01); *G06Q 50/28* (2013.01)

(58) Field of Classification Search
CPC .......................... G06F 16/2379; G06F 16/2365
See application file for complete search history.

(56) References Cited

U.S. PATENT DOCUMENTS

| | | | | |
|---|---|---|---|---|
| 2009/0080408 | A1* | 3/2009 | Natoli | H04L 67/12 370/351 |
| 2014/0040182 | A1* | 2/2014 | Gilder | G06F 16/256 707/602 |
| 2014/0279868 | A1* | 9/2014 | Astorg | G06F 16/22 707/741 |
| 2017/0287086 | A1* | 10/2017 | Lopez | G06Q 50/12 |
| 2022/0292584 | A1* | 9/2022 | Kumar | H04L 9/3213 |

* cited by examiner

*Primary Examiner* — Taelor Kim

(57) ABSTRACT

Systems and methods which provide for bidirectional data parity in a multi-service connected environment using a canonicalization and order connection data structure are described. Bidirectional data parity logic using a canonicalization and order connection data structure with respect to a plurality of systems of a multi-service connected environment may provide for the state of a particular order and/or other data for that order being accurately reflected in each such system for which corresponding record is maintained. Using a canonicalization database and an order connection database, bidirectional data parity logic may recognize all records for a particular instance of an order as being for that order, and thus provide data parity for that order throughout all systems having a record for that order instance.

30 Claims, 6 Drawing Sheets

| Canonicalization Database ||
| --- | --- |
| Canonical Source ID | Source Aliases |
| AMZ | Amazon; Amazon Inc.; Amazon.com |
| BCL | Big Commerce; Big Commerce; Big Commerce Pty. Ltd. |
| EBI | eBay; eBay Inc.; eBay.com |
| ETS | Etsy; Etsy Inc.; Etsy.com |
| MAG | Magento; Magento Commerce |
| SII | Shopify; Shopify Inc.; Shopify.com |
| VOL | Volusion; Volusion LLC; Volusion.com |
| ... | ... |

FIG. 3

| Order Connection Database |||||
|---|---|---|---|---|
| Order ID | Order Connection | Connection Order ID | Connection Category ||
| EBI - 10250 | EBI<br>BCL | E796AC<br>B009055 | M<br>W | } 401a |
| AMZ - 82278 | AMZ<br>BCL<br>SII | 7574892Z<br>B010799<br>656-58721 | M<br>W<br>W | } 401b |
| VOL - 10634 | VOL<br>MAG<br>BCL | V87221 - A<br>OL - 20 - 99856<br>B009968 | N<br>W<br>W | } 401c |
| ⋮ | ⋮ | ⋮ | ⋮ ||
| 410 | 420 | 430 | 440 ||

FIG. 4

SYSTEMS AND METHODS FOR BIDIRECTIONAL ECOMMERCE PARITY

TECHNICAL FIELD

The present invention relates generally to multi-service system interoperability and, more particularly, to facilitating bidirectional data parity in a multi-service connected environment.

BACKGROUND OF THE INVENTION

It is commonplace for various merchants, whether they be "brick and mortar" merchants, online merchants, or casual sellers (collectively referred to herein as merchants) to sell items through electronic marketplaces (e.g., eBay, Amazon Marketplace, Shopify, BigCommerce, Etsy, Magento Commerce, etc.). Often, a merchant may sell their items through a plurality of such electronic marketplaces, such as to increase their potential customer base, to take advantage of specific features of different marketplaces, etc. Sales of items through such electronic marketplaces typically necessitates various shipping management tasks, such as management of the item orders, managing the picking and packing of items for order fulfilment, generation of invoices, packing slips, manifests, shipping labels, and postage or other prepaid shipping indicia, and/or tracking of shipment of items through a shipping service provider.

Although the electronic marketplace systems generally provide some form of shipping management functionality, the particular shipping management tasks performed are often limited (e.g., the suite of shipping management functionality does not include shipping management functionality for all the tasks a merchant may desire) and/or are not robust (e.g., the functionality provided with respect to any particular shipping management task may be basic rather than full featured). In the situation where a merchant sells their items through multiple electronic marketplaces, even where one electronic marketplace system provides a reasonably complete suite of shipping management functionality, all of the shipping management tasks desired to be performed by the merchant may not be supported (or fully supported) by all (or even any) of the electronic marketplace systems. Accordingly, merchants may use various functionality of one or more services external to an electronic marketplace system through which an item or items are sold in order to avail themselves of desired shipping management functionality.

In one example, a first electronic marketplace system (e.g., BigCommerce, Magento Commerce, etc.) used by a merchant may provide one or more shipping management functionality features desired by the merchant that are not provided by a second electronic marketplace system (e.g., eBay, Amazon, etc.) used by the merchant. Moreover, the first electronic marketplace system may include an order aggregation feature, whereby a data link is enabled between the first electronic marketplace system and another electronic marketplace system (e.g., the second electronic marketplace system) to facilitate aggregation of a particular merchant's orders of items from multiple electronic marketplace systems within the first electronic marketplace system. Accordingly, the merchant may utilize the order aggregation feature to cause the first electronic marketplace system to aggregate orders for the merchant's items sold via the second electronic marketplace system with orders for items sold via the first electronic marketplace system in order to facilitate use of the one or more shipping management functionality features with respect to all such orders.

In another example, shipping management system which is not itself part of an electronic marketplace system may provide functionality for the management of item orders generated via one or more electronic marketplace system. For example, the SHIPSTATION shipping management system provided by Auctane LLC of Austin Texas, provides a robust suite of shipping management functionality, such as for managing the picking and packing of items for order fulfilment, generation of invoices, packing slips, manifests, shipping labels, and postage or other prepaid shipping indicia, and/or tracking of shipment of items through a shipping service provider, that supports a large number of the existing electronic marketplace systems. Such a shipping management system may include an order aggregation feature, whereby a data link is enabled between the shipping management system and a plurality of electronic marketplace systems to facilitate aggregation of a particular merchant's orders of items from multiple electronic marketplace systems within the shipping management system. Accordingly, the merchant may utilize the order aggregation feature to cause the shipping management system to aggregate orders for the merchant's items sold via a first electronic marketplace system with orders for items sold via a second electronic marketplace system in order to facilitate use of the one or more shipping management functionality features with respect to all such orders.

The foregoing connectivity provides multi-service connected environments in which multiple records of a particular instance of an order may be present simultaneously within the environment. For example, records for an instance of an order generated by the aforementioned second electronic marketplace system may appear both in the second electronic marketplace system and in the first electronic marketplace system (e.g., as a result of the order aggregation functionality of the first electronic marketplace system). Likewise, records for an instance of an order generated by the first electronic marketplace system may appear both in the first electronic marketplace system and in the aforementioned shipping management system (e.g., as a result of the order aggregation functionality of the shipping management system). An instance of an order generated by the second electronic marketplace system may appear in the second electronic marketplace and in the first electronic marketplace system (e.g., as a result of the order aggregation functionality of the first electronic marketplace system) as well as in the shipping management system (e.g., as a result of the order aggregation functionality of the shipping management system).

Often, where order aggregation has been performed, one or more systems may not recognize records for an instance of an order in a system having aggregated the orders. Further, various of the records for an instance of an order may be mistaken by one or more systems as an original instance of an order, leading to issues and errors associated phantom orders in the systems.

BRIEF SUMMARY OF THE INVENTION

The present invention is directed to systems and methods which provide for bidirectional data parity in a multi-service connected environment using a canonicalization and order connection data structure. Embodiments of the present invention implement bidirectional data parity logic in combination with a canonicalization database and an order connection database for providing bidirectional data parity with respect to orders processed in a multi-service connected environment.

A multi-service connected environment may, for example, comprise a plurality of electronic marketplace systems (e.g., systems implementing electronic marketplace platforms for eBay, Amazon Marketplace, Shopify, BigCommerce, Etsy, Magento Commerce, etc.) in which merchants may sell their items. Additionally, a multi-service connected environment may comprise one or more shipping management systems (e.g., the SHIPSTATION shipping management system provided by Auctane LLC of Austin Texas) providing shipping management functionality with respect to orders. One or more such systems of the multi-service connected environment may facilitate data connectivity with respect to other ones of the systems of the multi-service connected environment, such as through order aggregation functionality of the respective system.

Bidirectional data parity logic using a canonicalization and order connection data structure with respect to a plurality of systems of a multi-service connected environment according to concepts of the present invention provide for the state of a particular order and/or other data for that order being accurately reflected in each such system for which corresponding record is maintained. For example, using a canonicalization database and an order connection database of embodiments, bidirectional data parity logic may recognize all records for a particular instance of an order as being for that order, and thus provide data parity for that order throughout all systems having a record for that order instance. Accordingly, even where order aggregation is performed by one or more systems of the multi-service connected environment, the various records for an instance of an order are properly associated, not only facilitating the aforementioned data parity but also avoiding issues and errors associated phantom orders in the systems.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3 shows a portion of a canonicalization database of a canonicalization and order connection data structure of an embodiment of the present invention;

FIG. 4 shows a portion of an order connection database of canonicalization and order connection data structure of an embodiment of the present invention;

DETAILED DESCRIPTION OF THE INVENTION

Figure 1:
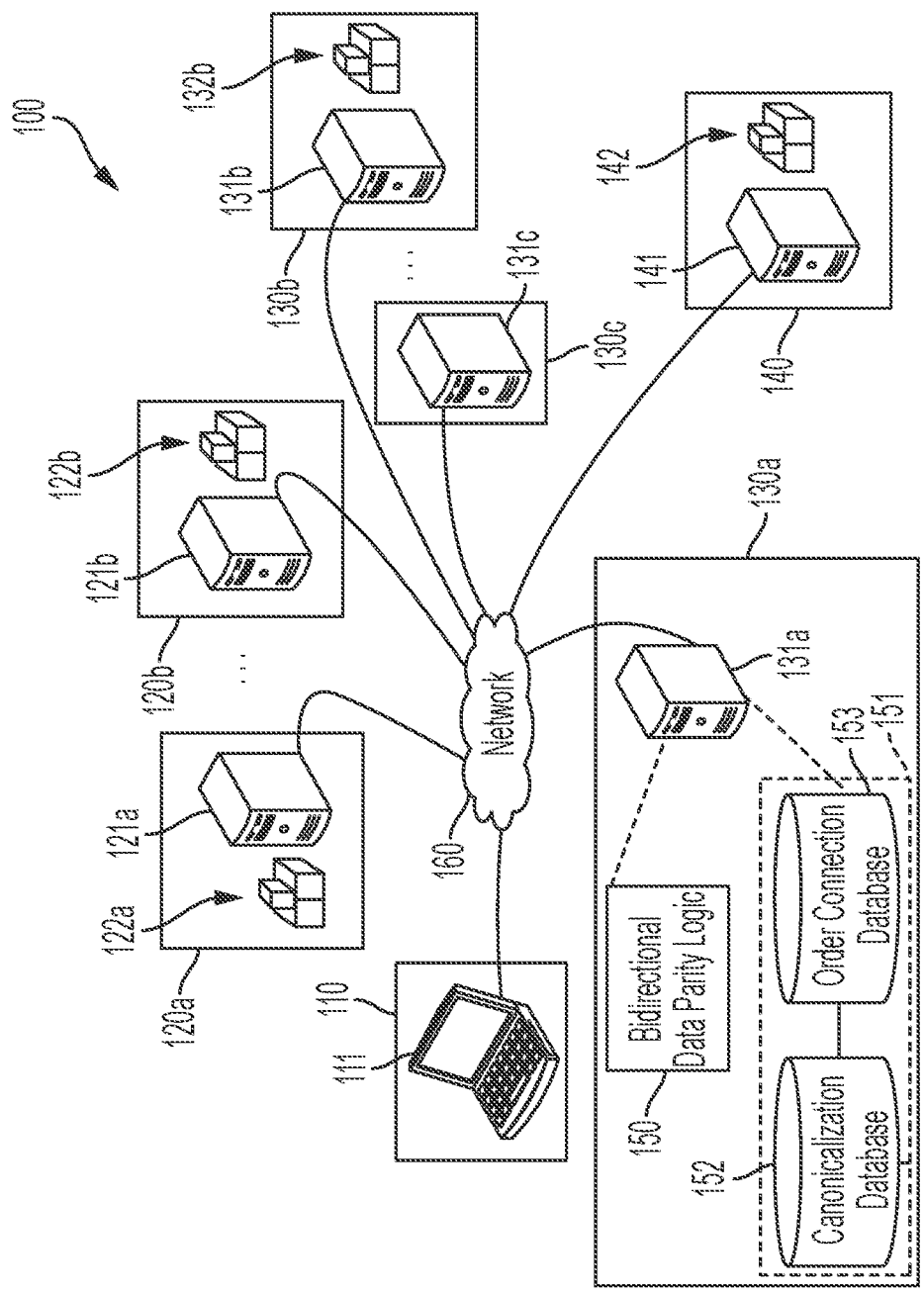
FIG. 1 shows a multi-service connected environment in which in which bidirectional data parity according to concepts of the present invention is provided.

An embodiment of a multi-service connected environment in which bidirectional data parity according to concepts of the present invention may be provided is shown in FIG. 1. In particular, FIG. 1 shows multi-service connected environment 100, such as may comprise a networked order processing environment, in which a plurality of electronic marketplaces (e.g., electronic marketplaces 120a and 120b) may operate to conduct transactions with purchasers (e.g., purchaser 110) of various items (e.g., one or more items of items 122a, 122b, 132b, and/or 142). Order aggregators (e.g., order aggregators 130a-130c) may provide for aggregation of particular merchants' orders of items from multiple electronic marketplace systems, such as for performing various shipping management tasks. Data parity, in which instances of data with respect to orders and/or other transactions occurring within multi-service connected environment are managed or otherwise maintained to be consistent, is enabled and provided with respect to systems of multiple ones of the foregoing entities of multi-service connected environment according to embodiments of the invention. Bidirectional parity, wherein changes in data of orders and/or other transactions are propagated down-stream (e.g., from a system that originated the order/transaction to one or more systems having an instance of the particular data) and up-stream (e.g., from one or more systems having an instance of the particular data to a system that originated the order/transaction) is provided according to embodiments herein.

It should be appreciated that the particular number of purchaser systems, electronic marketplace systems, and order aggregator systems shown in FIG. 1 are for simplifying the illustration and are not a limitation of the present invention. Multi-service connected environment 100 of embodiments may host different numbers of purchasers, merchants, electronic marketplaces, and order aggregators. It should further be appreciated that various systems (e.g., payment processing systems, shipping service provider systems, etc.) operable within a multi-service connected environment are not shown in example multi-service connected environment 100 for simplifying the illustration to aid in understanding concepts of the disclosure. Nevertheless, thousands, tens of thousands, hundreds of thousands, or even millions of merchants and/or purchasers may be present in multi-service connected environment 100. Similarly, tens, hundreds, thousands, or even tens of thousands of electronic marketplaces and/or order aggregators may be present in multi-service connected environment 100. Correspondingly, multiple instances of bidirectional data parity logic and respective canonicalization and order connection data structures, as described below, may be utilized to provide data parity with respect to orders generated or otherwise present within the multi-service connected environment.

Electronic marketplaces 120*a* and 120*b* may comprise one or more systems (e.g., electronic marketplace systems 121*a* and 121*b*, such as may comprise web server, electronic commerce server, computer workstation, enterprise computer network, user interface portal, etc.) of an electronic marketplace operator, such as eBay, Amazon Marketplace, Shopify, etc., operable to host platforms for the sale of items, whether items supplied by the electronic marketplace operator themselves, other merchants (e.g., merchant 140) offering their items (e.g., items 142) for sale through the electronic marketplace, individuals offering items for sale through the electronic marketplace, etc. Electronic marketplace systems 121*a*-121*b* of embodiments may thus comprise processor-based systems operable under control of an instruction set or instruction sets defining operation as described herein. For example, electronic marketplace systems 121*a* and 121*b* of embodiments may each comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus.

Merchant system 141 of embodiments may be configured to cooperate with electronic marketplace systems and/or purchaser systems, such as to conduct item sale transactions (e.g., e-commerce sales transactions, such as may include order processing, payment processing, remittance to intermediaries or other parties for items sold, etc.) with various purchasers of the merchant's goods (e.g., via purchaser systems 121*a* and 121*b*), and/or item fulfilment operations (e.g., inventory management, item picking and packaging scheduling, shipping/delivery label and/or other documentation generation, etc.). Merchant system 141 of embodiments may thus comprise one or more processor-based systems operable under control of an instruction set or instruction sets defining operation as described herein. For example, merchant system 141 of embodiments may comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus.

Purchaser system 111 of embodiments herein provides one or more systems by which a purchaser of items may interact with an electronic marketplace system and/or merchant system to facilitate procuring items by the purchaser. Purchaser system 111 of embodiments may thus comprise any number of system configurations used by a user for selecting, purchasing, or otherwise requesting one or more items to be procured by the purchaser. For example, purchaser system 111 may comprise a general purpose processor-based system (e.g., personal computer (PC) having a processor, memory, suitable input/output (I/O) functionality, and operating system (OS)) operating under control of an instruction set (e.g., a client application such as a PC client, web client, mobile client, tablet client, etc.) to interface with any of a number of electronic marketplace systems and/or merchant systems and provide operation as described herein. Additionally or alternatively, purchaser system 111 may comprise a processor-based mobile device such as a smart phone, a tablet device, a personal digital assistant (PDA), an Internet appliance (e.g., a processor-based electronic commerce appliance), etc., having the requisite instruction set and processing and I/O resources. As another example, purchaser system 111 may comprise a smart speaker (e.g., Amazon ECHO, Google HOME, etc.) or other voice interface (e.g., Apple SIRI, Google Assistant, etc.) operating on a processor-based platform and operable to provide functionality as described herein.

Merchants, such as merchant 140, may sell their items through multiple ones of the electronic marketplaces (e.g., electronic marketplaces 120*a* and 120*b*), such as to increase their potential customer base, to take advantage of specific features of different marketplaces, etc. Accordingly, merchant 140 may use one or more order aggregators (e.g., order aggregators 130*a*-130*c*) for facilitating various shipping management tasks with respect to the merchant's aggregated orders. For example, an order aggregator system may allow a merchant to use a same interface for performing shipping management functions with respect to orders generated by multiple different electronic marketplaces. Additionally or alternatively, an order aggregator system may provide shipping management functionality not provided, or not robustly provided, by an electronic marketplace.

Order aggregators 130*a*-130*c* may, for example, comprise one or more systems (e.g., order aggregator systems 131*a*, 131*b*, and 131*c*, such as may comprise web server, electronic commerce server, computer workstation, enterprise computer network, user interface portal, etc.) of an order aggregator service provider, such as BigCommerce, Magento Commerce, Volusion, ShipStation, ShipStation, etc., operable to host platforms for aggregating orders generated by a plurality of electronic marketplaces (e.g., electronic marketplaces 120*a* and 120*b*) and/or merchants (merchant 140). Order aggregator systems 131*a*, 131*b*, and 131*c* may thus comprise processor-based systems operable under control of an instruction set or instruction sets defining operation as described herein. For example, order aggregator systems 131*a*, 131*b*, and 131*c* of embodiments may each comprise one or more processors (e.g., a CORE or PENTIUM processor available from Intel, Inc.) and requisite processor readable (e.g., computer readable) memory (e.g., RAM, ROM, flash memory, disk memory, SSD memory, optical memory, and/or the like) and input/output components (e.g., display, NIC, keyboard, digital pointer, printer, and/or the like) coupled to a processor of the one or more processors via a data bus.

Order aggregators of multi-service connected environment 100 may provide functionality in addition to the aforementioned order aggregation and associated shipping service management. For example, an order aggregator (e.g., BigCommerce, Magento Commerce, etc.) may itself provide an electronic marketplace. Order aggregator 130*b* of the illustrated embodiment of multi-service connected environment 100 is shown as configured to conduct transactions with purchasers (e.g., purchaser 110) of various items (e.g., one or more items of items 122*a*, 122*b*, 132*b*, and/or 142) to thereby also provide an electronic marketplace. Additionally or alternatively, an order aggregator (e.g., ShipStation) may provide shipping management services, such as management of the item orders, managing the picking and packing of items for order fulfilment, generation of invoices, packing slips, manifests, shipping labels, and postage or other prepaid shipping indicia, and/or tracking of shipment of items through a shipping service provider. Accordingly, although being referred to herein as order aggregators, one or more such entities may provide order aggregation functionality as but one (perhaps even a minor or secondary one) of a plurality of functions provided by that entity.

Network 160 provides communication links with respect to and between merchant systems, purchaser systems, electronic marketplace systems, order aggregator systems, and/or other systems of multi-service connected environment 100 for facilitating operation as described herein. Accordingly, the links of network 160 are operable to provide suitable communication links for facilitating cooperative interaction and data transfer as described with respect to embodiments of the invention. Network 160 of embodiments may thus comprise one or more of a local area network (LAN), metropolitan area network (MAN), wide area network (WAN), wireless LAN (WLAN), the Internet, intranet, extranet, cable transmission system, cellular communication network, the public switched telephone network (PSTN), and/or the like.

Figure 2:
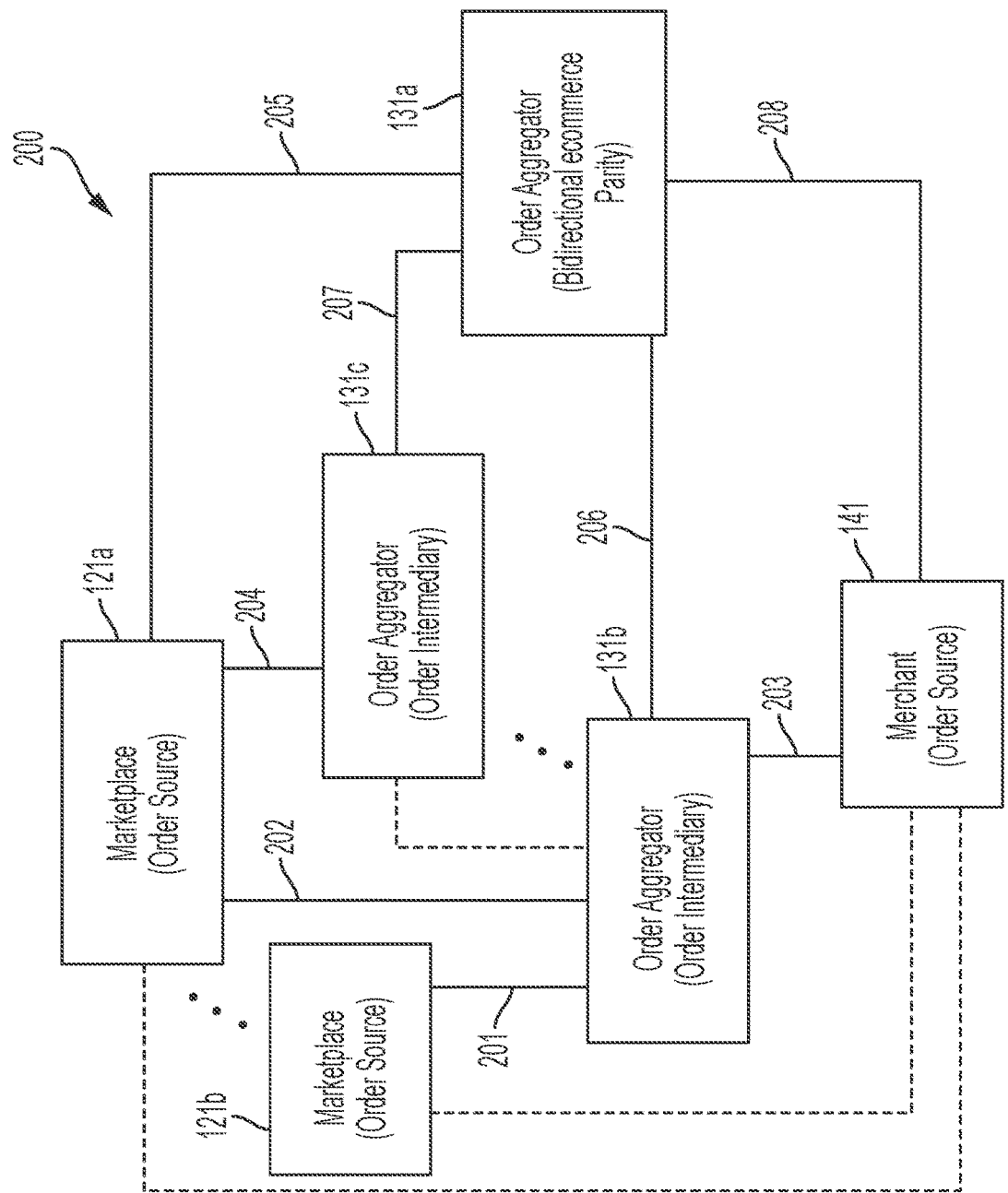
FIG. 2 shows a connectivity diagram illustrating order record connectivity between various systems of a multi-service connected environment according to embodiments of the present invention.

As shown in connectivity diagram 200 of FIG. 2, the order aggregators of multi-service connected environment 100 may be interconnected such that orders aggregated by a first order aggregator are subject to aggregation by a second order aggregator. For example, the order aggregator systems of the illustrated example include two tiers of order aggregators, wherein order aggregator systems 131b and 131c are logically connected in one such tier (e.g., an order intermediary tier) and order aggregator system 131a is logically connected in another such tier (e.g., re-aggregation tier).

In the illustrated example of connectivity diagram 200, order aggregator system 131b has connectivity (e.g., data links 201 and 202) to electronic marketplace systems 121a and 121b and connectivity (e.g., data link 203) to merchant system 141 for providing order aggregation functionality with respect to one or more merchants (e.g., merchant 140 and/or other merchants). Order aggregator system 131b may provide its own electronic marketplace, and thus the order aggregation functionality of order aggregator system 131b may be provided with respect to orders generated by order aggregator system 131b, electronic marketplace system 121a, electronic marketplace system 121b, orders uploaded by merchant system 141, and/or orders from other order sources. Also in the illustrated example, order aggregator system 131c has connectivity (e.g., data link 204) to electronic marketplace system 121a for providing order aggregation functionality with respect to one or more merchants. Order aggregator system 131c may provide its own electronic marketplace, and thus the order aggregation functionality of order aggregator system 131c may be provided with respect to orders generated by order aggregator system 131c, electronic marketplace system 121a, and/or orders from other order sources.

Order aggregator system 131a of the illustrated example not only has connectivity (e.g., data link 205) to electronic marketplace system 121a and connectivity (e.g., data link 208) to merchant system 141, but also has connectivity (e.g., data links 206 and 207) to order aggregator system 131b and order aggregator system 131c. Order aggregator system 131a may provide its own electronic marketplace, and thus the order aggregation functionality of order aggregator system 131a may be provided with respect to orders generated by order aggregator system 131a, order aggregator system 131b, order aggregator system 131c, electronic marketplace system 121a, orders uploaded by merchant system 141, and/or orders from other order sources. Order aggregation functionality of order aggregator system 131a may be provided with respect to orders for which records are stored by order aggregator system 131b and/or order aggregator system 131c (e.g., including orders generated by the order aggregation systems themselves as well as orders aggregated from other sources, such as electronic marketplaces 121a and/or 121b). That is, order aggregator systems 131b and 131c are disposed in connectivity diagram 200 as order intermediaries or derivative order sources with respect to order aggregator system 131a for orders originated by electronic marketplace 121a (e.g., electronic marketplace 121a being the original order source for certain orders that order aggregator systems 131b and 131c are derivative order sources for).

Although particular data links have been described above for the example of connectivity diagram 200, the concepts of the invention are not limited to application with respect to the particular data links illustrated. Accordingly, it should be appreciated that various data links in addition to or in the alternative to those of the example may be implemented, such as those shown by the dotted lines in FIG. 2. Likewise, various ones of the data links of the illustrated example may be omitted according to some implementations. Nevertheless, data links providing connectivity in which one or more order aggregator system is disposed as an intermediary system may be present.

As can be appreciated from the foregoing, the connectivity of multi-service connected environment 100 represented in connectivity diagram 200 provides an environment in which multiple records of a particular instance of an order may be present simultaneously (e.g., within the records of an order origination system and within one or more order aggregation systems). For example, records for an instance of an order generated by electronic marketplace system 121a may appear in an order database of electronic marketplace system 121a as well as within order databases of order aggregator systems 131a, 131b, and 131c. Where the connectivity is such that order aggregator systems (e.g., order aggregator systems 131b and 131c) are disposed as order intermediaries with respect to another order aggregator system (e.g., order aggregator system 131a), An order aggregation system maintaining connectivity to one or more other order aggregator systems may operate to "re-aggregate" such orders (i.e., treat multiple instances of records for an order as independent orders in an aggregated collection of orders), if the multiple instances of records regarding a particular order are not identified. Such re-aggregation can result in non-parity of data (e.g., order state data) between the multiple "orders", order processing duplication, etc. For example, if actions (e.g., shipping management tasks) are taken with respect to the instances of records for an order in more than one of the systems (e.g., two or more electronic marketplace systems, a shipping management system and one or more electronic marketplace systems, etc.), the state of a particular order and/or other data for that order may not be accurately reflected in each such system. However, where order aggregation has been performed, one or more systems may not recognize multiple records as being for an instance of an order. Instead, various of the records for an instance of an order may be mistaken by one or more systems as an original instance of an order, leading to not only a failure in data parity between records for a particular order.

Previous solutions to prevent multiple records for a particular order from being mistaken to be multiple original order instances and/or to prevent non-parity of data have been to remove connections leading to multiple paths for orders to be provided to an order aggregator system. For example, data link 204 may be removed between electronic marketplace system 121a and order aggregator system 131a, and possibly one or data links 205 or 206 between a respective one of order aggregators systems 131b and 131c and order aggregator system 131a (e.g., where order aggregator systems 131b and 131c aggregate orders generated by electronic marketplace system 131a for a same merchant), to provide a connectivity environment in which order aggregator systems 131b and 131c do not provide redundant paths for order records with respect to order aggregator system 131a. However, removing the direct data link between electronic marketplace system 121a and order aggregator system 131a introduces latency with respect to order aggregator system 131a obtaining information regarding orders generated by electronic marketplace system 121a. Moreover, to the extent that intermediary order aggregator systems 131b and 131c filter the order data available from electronic marketplace system 121a, order aggregator system 131a may not receive complete or robust order data from electronic marketplace system 121a (e.g., if order aggregator system 131a uses particular data fields of an order record that are not used by intermediary order aggregator systems 131b and 131c, those data fields would not be available to order aggregator system 131a). In an alternative example, data links 205 and/or 206 may be removed between order aggregator system 131a and intermediary order aggregator systems 131b and 131c are not intermediary to provide a connectivity environment in which order aggregator systems 131b and 131c do not provide redundant paths for order records with respect to order aggregator system 131a. However, removing data links between order aggregator system 131a and either or both of intermediary order aggregator systems 131b and 131c may prevent order aggregator system 131a from aggregating orders for a particular merchant that are generated by the respective intermediary order aggregator system, or which are otherwise only available to order aggregator system 131a through one of intermediary order aggregator systems 131b and 131c.

Order aggregator system 131a of the illustrated embodiment is configured to provide bidirectional parity with respect to aggregated orders of multi-service connected environment 100. Accordingly, order aggregator system 131a of embodiments may maintain connections with respect to systems of multi-service connected environment 100 whereby multiple paths for order records are provided, and yet data parity is maintained with respect to the multiple instances of records for orders.

For example, referring again to FIG. 1, order aggregator system 131a is shown as including bidirectional data parity logic 150 and canonicalization and order connection data structure 151 according to some embodiments of the invention. In the example of FIG. 1, bidirectional data parity logic 150 may comprise one or more instruction sets (e.g., program code) executed by a processor or processors of order aggregator system 131a to provide functionality as described herein. Canonicalization and order connection data structure 151 may, for example, provide information for recognizing multiple order records with respect to a plurality of systems of multi-service connected environment 100 as being for an same instance of an order. That is the multiple order records for a particular instance of an order are identified as being to the same order instance and reduced to a common order record (i.e., a canonicalized record of canonicalization and order connection data structure 151) by bidirectional parity logic 150 of embodiments. In operation according to embodiments, bidirectional data parity logic 150 uses canonicalization and order connection data structure 151 to provide for the state of a particular order, and/or other data for that order, being accurately reflected in a plurality of systems for which corresponding record is maintained.

Canonicalization and order connection data structure 151 of embodiments includes canonicalization database 152 and order connection database 153, such as may be configured for use by bidirectional data parity logic 150 for maintaining data parity with respect to multiple instances of records for orders. For example, using canonicalization database 152 and order connection database 153, bidirectional data parity logic 150 may recognize all records for a particular instance of an order as being for that particular order, and thus provide data parity for that order throughout systems of multi-service connected environment 100 having a record for that order instance.

In accordance with embodiments of the invention, canonicalization database 152 is configured to provide normalization data with respect to various sources of order data within multi-service connected environment 100. For example, canonicalization database 152 may provide a normalization table for various electronic marketplaces and/or other sources of orders or order records in multi-service connected environment 100 (collectively referred to as sources), whereby various means of referencing or identifying each of these sources may be translated to a respective normalized identifier.

An example of at least a portion of canonicalization database 152 according to an embodiment is shown in FIG. 3. In the exemplary embodiment of canonicalization database 152 illustrated in FIG. 3, canonical source identification (ID) information 310 is provided with respect to corresponding source aliases information 320. Canonical source ID information 310 provides normalized identifiers for corresponding one or more identifiers used with respect to a source by entities of multi-service connected environment 100. For example, assume that electronic marketplace system 121a is the Amazon marketplace system. The records of merchant system 141 for orders generated through electronic marketplace system 121a may designate the electronic marketplace as "Amazon". However, the records of order aggregator system 131b may designate this same electronic marketplace as "Amazon, Inc.", while the records of order aggregator system 131c may designate this electronic marketplace as "Amazon.com". Canonical source ID information 310 provides the normalized identifier "AMZ" for each of the different references to this particular source. Each of these versions of source identification information may thus comprise a source alias of source aliases information 320 corresponding to the canonical source ID "AMZ" of canonical source ID information 310 in the example of FIG. 3. Canonical source ID information 310 of the example likewise provides a normalized identifier for a plurality of other sources of multi-service connected environment.

It should be appreciated that the foregoing illustrative example of the Amazon marketplace system is simplified for facilitating an understanding of concepts herein. Rather than variations on an electronic marketplace name, the records maintained by systems within the multi-service connected environment may use identifiers (e.g., alphanumeric strings, sequence numbers, abbreviations, etc.) that are enigmatic and perhaps seemingly random to other systems of the multi-service connected environment. Moreover, there may be relatively subtle or otherwise difficult to resolve/identify differences between discrete sources within the multi-service connected environment. For example, certain electronic marketplaces may be related and share some at least some portion of the identification information (e.g., eBay and eBay motors), although comprising electronic marketplaces to be treated separately within the multi-service connected environment. Nevertheless, canonical source ID information 310 of embodiments provides a normalized identifier for each such identifier used with respect to a source.

In operation according to embodiments, bidirectional data parity logic 150 may analyze order records obtained by order aggregator system 131a from other systems within multi-service connected environment for source identification information and utilize canonicalization database 152 to normalize that information. For example, order aggregator system 131a may obtain order records from electronic marketplace system 121a, order aggregator system 131b, order aggregator system 131c, merchant system 141, etc., such as for providing order aggregation functionality, shipping management functionality, etc. Logic of bidirectional data parity logic 150 may analyze the records for source identification information and translate the source information to a canonical source ID using canonicalization database 152. For example, bidirectional data parity logic 150 may compare putative source identification information within order records obtained from other systems to source aliases of source aliases 320 to identify a corresponding canonical source ID of canonical source IDs 310.

When putative source identification information within order records obtained from other systems does not match a source alias of source aliases 320, error processing may be undertaken to update canonicalization database 152 to translate the source identification information to a respective normalized identifier. For example, bidirectional data parity logic 150 may issue an error message to an operator, a machine learning process, etc., for analyzing the putative source identification information and either determining an existing canonical source ID to which it corresponds (e.g., in the case of a previously unknown source alias variant for the canonical source ID) or adding a new canonical source ID and source alias correspondence record (e.g., in the case of a previously unknown source in the multi-service connected environment).

In accordance with embodiments of the invention, order connection database 153 is configured to provide multi-connection order record consolidation with respect to order records obtained by order aggregator system 131a from other systems of multi-service connected environment 100. For example, order connection database 153 may provide an instance of an order consolidation record for a same order obtained from other sources within multi-service connected environment 100, such as an original source, one or more derivative sources (e.g., intermediary sources and other secondary sources of order records), etc. Order connection database 153 of embodiments may, for example, correlate order connection information with canonical source information in the order consolidation records. Order consolidation records of embodiments of order connection database 153 may additionally correlate, or in some examples include, information regarding details of the order (e.g., information regarding the merchant, purchaser, item(s) purchased, payment, shipping service level, special handling instructions, order status, etc.). Such order detail information may, for example, be stored in an order database (not shown) or other relational database.

Bidirectional data parity logic 150 of embodiments may utilize the order consolidation records of order connection database 153 to facilitate data parity with respect to order records throughout multi-service connected environment 100. For example, utilizing the canonical source ID information of canonicalization database 152 and order consolidation records of order connection database 153, bidirectional data parity logic 150 may recognize all records for a particular instance of an order as being for that particular order. Moreover, bidirectional data parity logic 150 may recognize the original source for the order. Using the foregoing information, bidirectional data parity logic 150 of embodiments provides data parity for an order throughout systems of multi-service connected environment 100 that have a record for that order instance.

An example of at least a portion of order connection database 153 according to an embodiment is shown in FIG. 4. Order connection database 153 of the illustrated example includes a plurality of order consolidation records, shown as including order consolidation records 401a, 401b, and 401c. The order consolidation records of order connection database 153 shown in FIG. 4 include order ID information 410, order connection information 420, and connection order ID information 430 configured to correlate order connection information with canonical source information in the order consolidation records. In accordance with some embodiments of the invention, order connection information 420 provides identification of a particular source (e.g., an original source, a derivative source, etc.) having an instance of an order record and connection order ID information 430 provides order identification information used by the corresponding source with respect to that order. For example, connection order ID information 430 may comprise a unique order identifier assigned to an order by a source having a record for an order instance. Correspondingly, order connection information 420 may comprise canonical source identification (e.g., as may be determined using canonicalization database 152) of the particular source associated with the unique order identifier.

Order ID information 410 of embodiments provides a unique order identifier for a particular order and its order record instances known to bidirectional data parity logic 150. For example, order ID information 410 may comprise a unique order identifier assigned to an order, and associated with sources having records for that order, by bidirectional data parity logic 150. Order ID information 410 of embodiments correlates an order consolidation record with an original source for the order. For example, order ID information 410 may comprise canonical source identification (e.g., as may be determined using canonicalization database 152) for the original source. In the illustrated example, order ID information 410 comprises a concatenation of canonical source identification (e.g., canonical source ID information 402) and a unique order designator (e.g., designator information 403). Canonical source ID information 402 may be obtained from canonicalization database 152 for a source identified as an original source of an order, as described in detail below. Designator information 403 may comprise a unique designator (e.g., alphanumeric string, sequence number, etc.) assigned to the particular order, such as by bidirectional data parity logic 150. It should be appreciated that such a unique designator may be unique in the sense that it is not repeated in normal use of the designators so that an order may be substantially uniquely identified by order ID information 410 of embodiments.

In operation according to embodiments, order aggregator system 131a obtains order records from one or more systems of multi-service connected environment 100 to which order aggregator system 131a is connected. It can be appreciated from the foregoing that instances of order records may be obtained from an original order source (e.g., electronic marketplace 121a in the example described with reference to FIG. 2) and from one or more derivative order sources (e.g., order aggregator systems 131b and 131c in the example of FIG. 2). Order connection database 153 of embodiments includes connection category information 440 as may correspond to the original/derivative nature of a source of order records. For example, connection category information 440 may provide designators regarding source hierarchical disposition and, in some instances, connectivity status with respect to the source and order aggregator system 131a. In the example illustrated in FIG. 4, connection category information 440 includes a master designator (e.g., "M") corresponding to an original order source and a watcher designator (e.g., "W") corresponding to a derivative order source. The illustrated example of connection category information 440 also includes a no-connection designator (e.g., "N") corresponding to an original order source to which order aggregator system 131a is not directly connected (e.g., the order aggregator system obtains order records for orders originated by the original source only via derivative sources). As described below, bidirectional data parity logic 150 may utilize connection category information 440 in providing for the state of a particular order and/or other data for that order being accurately reflected in each such system for which corresponding record is maintained.

Figure 5:
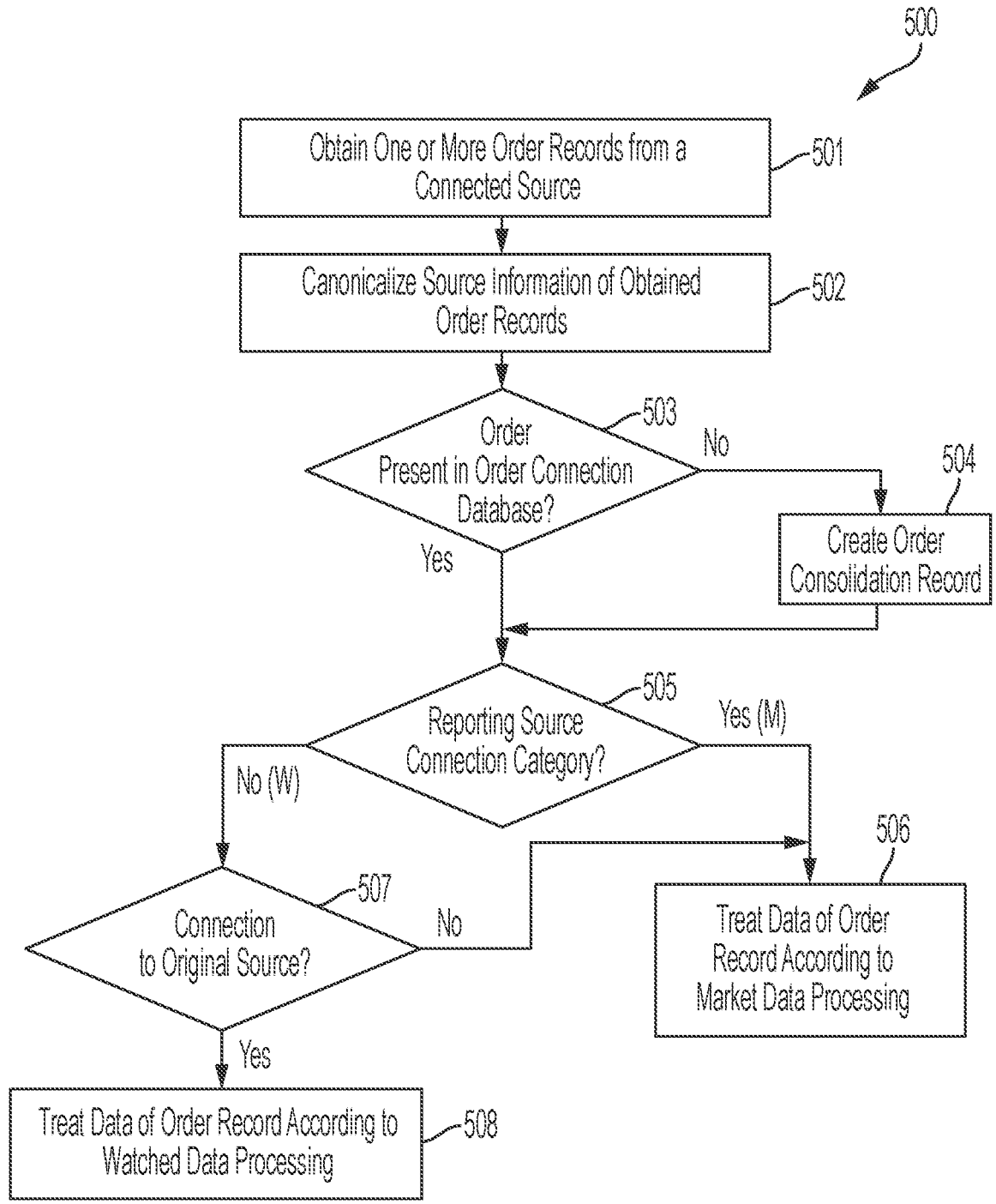
FIGS. 5 and 6 show examples of operation to provide bidirectional data parity in a multi-service connected environment according to embodiments of the invention.
Figure 6:
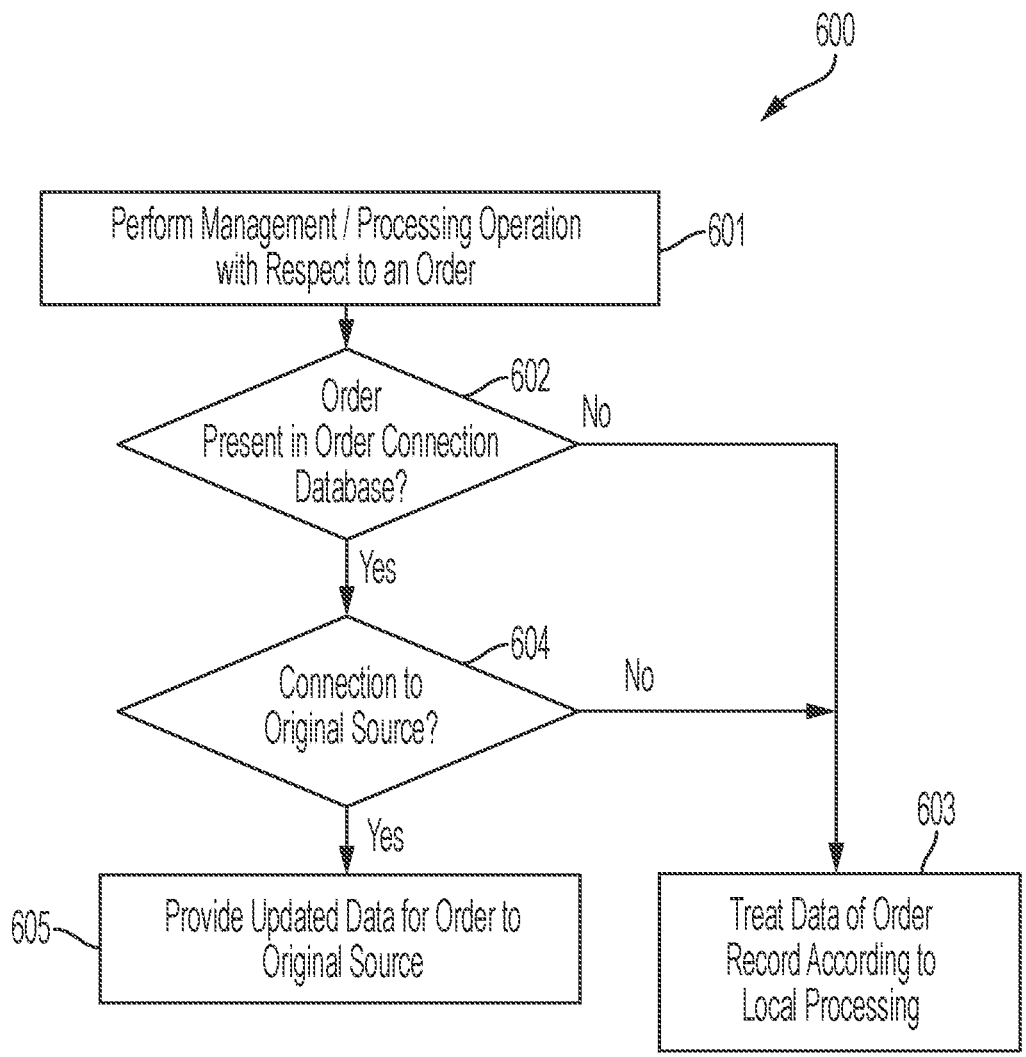

FIGS. 5 and 6 show examples of operation by bidirectional data parity logic 150 to provide bidirectional data parity in multi-service connected environment 100 according to some embodiments of the invention. In particular, flow 500 of FIG. 5 shows an example of downlink (i.e., data path from a source to order aggregator system 131a) data parity operation in accordance with concepts of a bidirectional data parity implementation. Correspondingly, flow 600 of FIG. 6 shows an example of uplink (i.e., data path from order aggregator system 131a to a source) data parity operation in accordance with concepts of a bidirectional data parity implementation.

Referring first to the downlink data parity operation of FIG. 5, at block 501 of the illustrated example order aggregator system 131a obtains one or more order records from a connected source. For example, bidirectional data parity logic 150 of order aggregator system 131a may utilize the data links shown in the example of FIG. 2 to request, or otherwise obtain (e.g., receive push notifications containing), order records from a system or systems (e.g., electronic marketplace system 121a, order aggregator system 131b, order aggregator system 131c, merchant system 141, etc.) of multi-service connected environment 100, such as for aggregating the orders, performing various shipping management tasks, etc. The order records may, for example, include information regarding an order source (e.g., the source reporting the order record), order identification information (e.g., an order identifier used by the source reporting the order record), details regarding the order (e.g., information regarding the merchant, purchaser, item(s) purchased, payment, shipping service level, special handling instructions, etc.).

As described above, order records may be provided by an original source and/or by one or more derivative sources. Accordingly, when obtaining order records from a connected source, bidirectional data parity logic 150 of embodiments may obtain information regarding the original source of orders for which order records are obtained. For example, although a derivative source may natively not identify an order record as being a derivative order record (i.e., obtained from another source) and only report their order identification information for orders, information regarding the identification of an original source and the original order identification information may be requested or otherwise obtained by bidirectional data parity logic 150. Where an order record is being provided by a derivative source, such a request may thus result in identification information for the original source and the order identification information designated for the order by the original source being provided to order aggregation system 131a.

At block 502 of the example of FIG. 5, source information of the obtained order records is canonicalized. For example, source identification information, such as may include identification information in the form of aliases for an original source and/or identification information for one or more derivative sources, may be translated to corresponding canonical source IDs by bidirectional data parity logic 150 using canonicalization database 152.

Bidirectional data parity logic 150 of embodiments may, at block 503 of flow 500, analyze the order records obtained from another system of multi-service connected environment 100 to determine if an order corresponding to an obtained order record is not already present in order connection database 153 (e.g., an obtained order comprises a "new" order with respect to order aggregator system 131a). For example, bidirectional data parity logic 150 may compare connection order identification information for obtained order records with data of connection order ID information 430 within order connection database 153 to determine if any instance of an order record for the particular order has been previously obtained by order aggregator system 131a.

If an order record obtained by order aggregator system 131a is not already present in order connection database 153 (e.g., no order record for the particular order has been previously obtained by order aggregator system 131a), processing according to flow 500 of the example of FIG. 5 proceeds to block 504. At block 504, bidirectional data parity logic 150 may create an order consolidation record in order connection database 153 for the order. For example, bidirectional data parity logic 150 may create a new order consolidation record and populate order connection information 420 thereof with a canonical source ID (e.g., provided at block 502) and connection order ID information 430 thereof with corresponding order identification. The order connection information and connection order ID information for a derivative source (e.g., a source reporting the obtained order record when information regarding an original source provided in association with the obtained order record is other than the source reporting the obtained order record) may be designated as a watcher (e.g., "W") in connection category information 440 of the order consolidation record. The order connection information and connection order ID information for an original source (e.g., an original source identified by a derivative source in association with reporting the order record or a source reporting the obtained order record when information regarding an original source provided in association with the obtained order record is the same as the source reporting the obtained order record) may be designated as a master (e.g., "M") in connection category information 440 of the order consolidation record, such as where order aggregator system 131a has connectivity with respect to the original source. Alternatively, the order connection information and connection order ID information for an original source may be designated as a master having no connection (e.g., "N") in connection category information 440 of the order consolidation record, such as where order aggregator system 131*a* does not have connectivity with respect to the original source.

Order ID information 410 may be generated for the order consolidation record created at bock 504 of embodiments and included in the new order consolidation record. For example, bidirectional data parity logic 150 may generate a concatenation of canonical source identification information (e.g., as may be determined using canonicalization database 152 from an original source identified by a derivative source in association with reporting the order record, a source reporting the obtained order record when information regarding an original source provided in association with the obtained order record is the same as the source reporting the obtained order record, etc.) and a unique order designator (e.g., alphanumeric string, sequence number, etc.) assigned to the particular order by bidirectional data parity logic 150.

If an order record obtained by order aggregator system 131*a* is already present in order connection database 153 (e.g., an order record for the particular order has been previously obtained by order aggregator system 131*a*), processing according to flow 500 of the example of FIG. 5 proceeds to block 505. Bidirectional data parity logic 150 of embodiments may, at block 505 of flow 500, analyze connectivity category information 440 of the order consolidation record in order connection database 153 corresponding to the source reporting the order record to determine how data of the order record is to be treated for data parity purposes. For example, in accordance with some embodiments of the invention, data of an order record reported by an original source (e.g., connection category "M") may be used to update information regarding details of the order (e.g., information regarding the merchant, purchaser, item(s) purchased, payment, shipping service level, special handling instructions, order status, etc.) stored by order aggregator system 131*a*. In contrast, data of an order record reported by a derivative source (e.g., connection category "W") may generally not be used to update information regarding details of the order stored by order aggregator system 131*a*, although this data may nevertheless be used for various other purposes (e.g., to determine the reliability/accuracy of the derivative source order records, to provide a source of order data when a connection to an original source fails, etc.).

In accordance with the foregoing, an original source for an order is in essence designated a "master" of order data for that order, and thus data of order records reported to order aggregator system 131*a* by such a master (e.g., electronic marketplace 121*a* in FIG. 2) may be treated as trusted data for the order and thus a source for updated data. Accordingly, if connection category 440 for the reporting source is determined to be a master (e.g., "M") at block 505, processing according to the illustrated example proceeds to block 506. At block 506 of embodiments, bidirectional data parity logic 150 may treat data of the order record according to master data processing protocols. For example, bidirectional data parity logic 150 may use data (e.g., information regarding the merchant, purchaser, item(s) purchased, payment, shipping service level, special handling instructions, order status, etc.) of the order record to update an order record for the order stored by order aggregator system 131*a*. According to some embodiments, order consolidation records of order connection database 153 may correlate an order data database, or in some examples include order data, wherein data is updated using data of a reported order record.

A derivative source is, however, in essence designated a "watcher" of order data, and thus data of order records reported to order aggregator system 131*a* by such watchers (e.g., order aggregator system 131*b* and order aggregator system 131*c* in FIG. 2) may be treated as secondary data for the order and thus generally not a source for updated data. Accordingly, if connection category 440 for the reporting source is determined to be a watcher (e.g., "W") at block 505, processing according to the illustrated example proceeds to block 507. Bidirectional data parity logic 150 of embodiments may, at block 507 of flow 500, analyze the order consolidation record of order connection database 153 to determine if a connection to an original source is indicated. For example, bidirectional data parity logic 150 may analyze an entry in the order consolidation record for the original source to determine if connection category 440 for that source is designated as a master (e.g., "M") or a master having no connection (e.g., "N"). Additionally or alternatively, bidirectional data parity logic 150 may analyze the connectivity with the original source indicated in the order consolidation record (e.g., "ping" electronic marketplace system 121*a* via data link 205, determine a state of data link 205 based upon metrics such as a last time of successful data transmission, etc.) to determine a current state of connectivity with respect to an original source.

If a connection to an original source is indicated in the order consolidation record (e.g., a derivative source is reporting an order record for an order for which order aggregator system 131*a* has a connection for receiving order records from the original source) and/or is currently viable, processing according to flow 500 of the example of FIG. 5 proceeds from block 507 to block 508. At block 508, bidirectional data parity logic 150 may treat data of the order record according to watched data processing protocols. For example, the data reported by the derivative source in the order record, for which order aggregator system 131*a* has a connection with the original source, may be ignored or otherwise not used to update information regarding details of the order stored by order aggregator system 131*a*. A watched data processing protocol may use the data of order records reported by derivative sources for various purposes, such as to compare to data as reported by the original source to determine the reliability/accuracy of the derivative source order records (e.g., to rank derivative sources according to reliability, timeliness, etc., such as for their possible use as secondary sources for order data).

If, however, a connection to an original source is not indicated in the order consolidation record (e.g., a derivative source is reporting an order record for an order for which order aggregator system 131*a* does not have a connection for receiving order records from the original source) and/or is not currently viable, processing according to flow 500 of the example of FIG. 5 proceeds from block 507 to block 506. In this situation, the data of the order record, although not being provided by an original source, is being provided where there is no connectivity to the original source and thus the primary source for data regarding the order is not available to order aggregation system 131*a*. Accordingly, at block 506 of embodiments, bidirectional data parity logic 150 may treat data of the order record provided by a derivative source, where connectivity with the original source is not available, according to master data processing protocols. Thus, bidirectional data parity logic 150 may use data (e.g., information regarding the merchant, purchaser, item(s) purchased, payment, shipping service level, special handling instructions, order status, etc.) of the order record from such a secondary source to update an order record for the order stored by order aggregator system 131*a*. Such operation may be utilized to provide a source of order data when a connection to an original source fails, has not been established, etc.

Referring now to the uplink data parity operation of FIG. 6, at block 601 of the illustrated example order aggregator system 131a performs a management or processing operation with respect to an order. For example, order aggregator system 131a may perform one or more shipping management tasks (e.g., management of the item orders, managing the picking and packing of items for order fulfilment, generation of invoices, packing slips, manifests, shipping labels, and postage or other prepaid shipping indicia, and/or tracking of shipment of items through a shipping service provider) with respect to an order.

Bidirectional data parity logic 150 of embodiments may, at block 602 of flow 600, analyze order connection database 153 to determine if an order consolidation records is present for the order. For example, bidirectional data parity logic 150 may compare order identification information for the order to order identification information of order connection database 153 to determine if one or more connections are maintained by order aggregator system 131a with other systems of multi-service connected environment 100. An order consolidation record entry in order connection database 153 may, for example, indicate that a connection is maintained with one or more other systems of multi-service connected environment 100 with respect to the order.

If an order consolidation record is not present in order connection database 151 for the order (e.g., connectivity is not maintained by order aggregator system 131a with another system with respect to the order), processing according to flow 600 of the example of FIG. 6 proceeds from block 602 to block 603. At block 603, bidirectional data parity logic 150 may treat data of the order record according to local data processing protocols. For example, the data for the order may be utilized locally by order aggregator system 131a without reporting an order record with updated data in an uplink data link (e.g., data links 205, 206, and 207). It should be appreciated that a local data processing protocol, although not providing data to one or more putative sources (e.g., electronic marketplace system 121a, order aggregator system 131b, order aggregator system 131c, etc.), may nevertheless provide for communication of order data to other systems of multi-service connected environment. For example, order aggregator system 131b may provide data with respect to an order for which one or more management or processing operation has been performed to a system or systems (e.g., merchant system 141) for which or at the request of which the operation was performed. Such communication may, for example, be external to bidirectional data parity functionality provided with respect to orders processed in multi-service connected environment 100, and may instead be native to the management or processing operation performed. Additionally or alternatively, a local data processing protocol of some embodiments may provide order records having updated data to one or more putative sources (e.g., one or more derivative sources, such as order aggregator system 131b, order aggregator system 131c, etc.) when no connectivity is maintained with respect to the original source (e.g., electronic marketplace system 121a), such as to facilitate propagation of the updated data throughout multi-service connected environment in some situations.

If, however, an order consolidation record is present in order connection database 151 for the order (e.g., connectivity is maintained by order aggregator system 131a with one or more other systems with respect to the order), processing according to flow 600 of the example of FIG. 6 proceeds from block 602 to block 605. At block 605, bidirectional data parity logic 150 may provide updated data for the order to one or more connected systems of multi-service connected environment 100. For example, bidirectional data parity logic 150 may report an order record including updated data for the order to the original source (e.g., electronic marketplace system 121a in the example of FIG. 2). The updated data may, for example, reflect an updated state and/or other information resulting from performance of a task of the management or processing operation undertaken by order aggregator system 131a. In accordance with some embodiments, bidirectional data parity logic 150 may report the order record with the updated data to the original source for the order (e.g., electronic marketplace system 121a), without reporting the order record to derivative sources (e.g., order aggregator systems 131b and 131c). Such reporting of updated data to the original source may, for example, rely upon the connectivity of the original source to propagate the updated data as appropriate systems of multi-service connected environment 100, facilitating data parity throughout the environment.

As can be appreciated from the foregoing, data parity is facilitated with respect to a plurality of systems in a multi-service connected environment according to embodiments of the invention. For example, even where order aggregation is performed by one or more systems of the multi-service connected environment, the various records for an instance of an order are properly associated, such as using a canonicalization and order connection data structure. Data parity is facilitated according to embodiments of the invention with respect to downlink connectivity (e.g., data provided from an original source of an order to another system of the multi-service connected environment), uplink connectivity (e.g., data for an order is provided by a system of the multi-service connected environment to an original source of the order), or a combination thereof. Moreover, issues and errors associated phantom orders in the systems of the multi-service connected environment are avoided according to embodiments of the invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A system for providing data parity in multiple systems of a multi-service connected environment, the system comprising:

a memory, of an order aggregator system providing aggregation of orders for items from a plurality of electronic marketplace systems of the multiple systems of the multi-service connected environment, having a plurality of databases of a canonicalization and order connection data structure configured to provide normalization data with respect to the plurality of electronic marketplace systems sourcing item order data for the orders for items within the multi-service connected environment and to provide multi-connection order record consolidation with respect to item order records for a particular order for items for which multiple instances of an order for items are obtained from the multiple systems of the multi-service connected environment, wherein the multiple systems include an original source for an instance of a first order for items and one or more derivative sources for one or more instances of the first order for items; and at least one processor, of the order aggregator system, coupled to the memory and executing bidirectional data parity logic configuring the at least one processor to use the canonicalization and order connection data structure to provide the data parity with respect to the multiple instances of the order for items for the particular order for items in the multiple systems of the multi-service connected environment, wherein the data parity maintains data of the instances of the first order for items by providing updated data reflecting an updated state for data of the first order for items to one or more of: the original source for the instance of the first order for items or the one or more derivative sources for the one or more instances of the first order for items storing the item order records of the instances of the first order for items.

2. The system of claim 1, wherein the plurality of databases of the canonicalization and order connection data structure comprise:
a canonicalization database providing a normalization table for the plurality of electronic marketplace systems sourcing item order data for the orders for items.

3. The system of claim 2, wherein the at least one processor executing the bidirectional data parity logic uses the canonicalization database to translate source identification information of the multiple instances of the order for items obtained by the order aggregator system to a respective normalized identifier.

4. The system of claim 3, wherein the at least one processor executing the bidirectional data parity logic uses the respective normalized identifier for an electronic marketplace system originally sourcing the particular order to generate order identification information for an order consolidation record of the canonicalization and order connection data structure.

5. The system of claim 1, wherein the plurality of databases of the canonicalization and order connection data structure comprise:
an order connection database providing an instance of an order consolidation record for the particular order for items for which multiple instances of the order for items are obtained from the multiple systems of the multi-service connected environment.

6. The system of claim 5, wherein the order connection database utilizes a respective normalized identifier for an electronic marketplace system originally sourcing the particular order for items, derived from canonicalized data of the canonicalization and order connection data structure, as order identifier information for each order consolidation record for the particular order for items.

7. The system of claim 5, wherein each order consolidation record of the order connection database comprises:
order connection information providing information regarding connectivity of the order aggregator system with one or more sources of order records within the multi-service connected environment.

8. The system of claim 7, wherein the one or more sources of an order consolidation record include the original source and the one or more derivative sources.

9. The system of claim 8, wherein the order consolidation record including the original source and the one or more derivative sources categorizes the original source as either a master or a master having no connection and categorizes the one or more derivative sources as watchers.

10. The system of claim 8, wherein the at least one processor executing the bidirectional data parity logic is configured to report updated data for the particular order for items to the original source based upon the order consolidation record corresponding to the particular order for items.

11. The system of claim 10, wherein the at least one processor executing the bidirectional data parity logic is configured to report the updated data for the particular order for items to the original source without reporting the updated data for the particular order for items to the one or more derivative sources based upon the order consolidation record corresponding to the particular order for items.

12. The system of claim 8, wherein the at least one processor executing the bidirectional data parity logic is configured to update data regarding the particular order for items using data of a data record reported by the original source based upon the order consolidation record corresponding to the particular order for items.

13. The system of claim 8, wherein the at least one processor executing the bidirectional data parity logic is configured to leave data regarding the particular order for items un-updated when receiving a data record for the particular order for items reported by a derivative source of the one or more derivative sources based upon the order consolidation record corresponding to the particular order for items.

14. The system of claim 8, wherein a derivative source of the one or more derivative sources comprises an intermediary order aggregator system with respect to the order aggregator system and the original source.

15. The system of claim 1, wherein the multi-service connected environment comprises a networked order processing environment.

16. A method for providing bidirectional data parity in multiple systems of a multi-service connected environment, the method comprising:
providing normalization data with respect to a plurality of electronic marketplace systems sourcing item order data for orders for items within the multi-service connected environment to provide canonical source identification information of a canonicalization database for each electronic marketplace system of the plurality of electronic marketplace systems, wherein the canonical source identification information provides a respective normalized identifier for corresponding identifiers used with respect to a respective electronic marketplace system of the plurality of electronic marketplace systems by multiple systems of the multi-service connected environment;
consolidating item order records for a particular order for items for which multiple instances of an order for items are obtained from the multiple systems of the multi-service connected environment to provide an order consolidation record of an order connection database for the particular order for items, wherein order consolidation records of the order connection database provide correlation of order connection information with the canonical source identification information, wherein the multiple systems include an original source for an instance of a first order for items and one or more derivative sources for one or more instances of the first order for items; and controlling updating data of the instances of the first order for items by providing updated data reflecting an updated state for data of the first order for items to one or more of: the original source for the instance of the first order for items or the one or more derivative sources for the one or more instances of the first order for items based upon a corresponding order consolidation record of the order connection database.

17. The method of claim 16, where the controlling updating data of the instances of the first order for items for the particular order for items based upon the corresponding order consolidation record of the order connection database comprises:

reporting updated data regarding the particular order for items to an original source of the particular order for items based upon the order consolidation record corresponding to the particular order for items.

18. The method of claim 17, wherein the reporting the updated data to the original source of the particular order for items is performed without reporting the updated data regarding the particular order for items to a derivative source of the particular order for items based upon the order consolidation record corresponding to the particular order for items.

19. The method of claim 16, where the controlling updating data of the instances of the first order for items for the particular order for items based upon the corresponding order consolidation record of the order connection database comprises:

updating data regarding the particular order for items using data of a data record reported by an original source of the particular order for items based upon the order consolidation record corresponding to the particular order for items.

20. The method of claim 16, where the controlling updating data of the instances of the first order for items for the particular order for items based upon the corresponding order consolidation record of the order connection database comprises:

leaving data regarding the particular order for items un-updated when receiving a data record for the particular order for items reported by a derivative source of the particular order for items based upon the order consolidation record corresponding to the particular order for items.

21. The method of claim 16, wherein the controlling updating data of the instances of the first order for items for the particular order for items based upon the corresponding order consolidation record of the order connection database is under control of bidirectional data parity logic of an order aggregator system of the multiple systems of the multi-service connected environment.

22. The method of claim 21, wherein the canonicalization database and the order connection database comprise a canonicalization and order connection data structure of the order aggregator system.

23. The method of claim 16, wherein the multi-service connected environment comprises a networked order processing environment.

24. An order aggregator system of a multi-service connected environment, the order aggregator system comprising:

a memory having a plurality of databases of a canonicalization and order connection data structure, of the order aggregator system of the multi-service connected environment, wherein the plurality of databases are used by the order aggregator system to provide aggregation of orders for items from a plurality of electronic marketplace systems of multiple systems of the multi-service connected environment and to provide bidirectional data parity in the multiple systems of the multi-service connected environment, wherein the multiple systems include an original source for an instance of a first order for items and one or more derivative sources for one or more instances of the first order for items, and wherein the plurality of databases include:

a canonicalization database having a normalization table configured to provide normalization data with respect to the plurality of electronic marketplace systems sourcing item order data for the orders for items within the multi-service connected environment, wherein the normalization data provides canonical source identification information providing a respective normalized identifier for corresponding identifiers used with respect to a respective electronic marketplace system of the plurality of electronic marketplace systems by systems of the multiple systems of the multi-service connected environment; and an order connection database having an instance of an order consolidation record for a particular order for items for which multiple instances of an order for items are obtained from a plurality of sources within the multi-service connected environment, wherein the order consolidation record provides correlation of order connection information with the canonical source identification information; and at least one processor, of the order aggregator system, coupled to the memory and executing bidirectional data parity logic configuring the at least one processor to use the canonicalization database and the order connection database to provide the bidirectional data parity with respect to the instances of the order for items for the particular order for items in the multiple systems of the multi-service connected environment, wherein the bidirectional data parity maintains data of the instances of the first order for items by providing updated data reflecting an updated state for data of the first order for items to one or more of: the original source for the instance of the first order for items or the one or more derivative sources for the one or more instances of the first order for items storing item order records of the instances of the particular order for items.

25. The order aggregator system of claim 24, wherein the order consolidation record of the order connection database comprises:

the respective normalized identifier for an electronic marketplace system originally sourcing the particular order for items, wherein the normalized identifier is derived from the canonical source identification information of the normalization data.

26. The order aggregator system of claim 24, wherein the order consolidation record of the order connection database comprises:

order connection information providing information regarding connectivity of the order aggregator system with one or more sources of order records within the multi-service connected environment.

27. The order aggregator system of claim 26, wherein the at least one processor executing the bidirectional data parity logic is configured to report updated data for the particular order for items to an original source of the particular order for items based upon the order consolidation record corresponding to the particular order for items.

28. The order aggregator system of claim 27, wherein the at least one processor executing the bidirectional data parity logic is configured to report the updated data for the particular order for items to the original source of the particular order for items without reporting the updated data for the particular order for items to a derivative source of the particular order for items based upon the order consolidation record corresponding to the particular order for items.

29. The order aggregator system of claim 26, wherein the at least one processor executing the bidirectional data parity logic is configured to update data for the particular order for items using data of a data record reported by an original source of the particular order for items based upon the order consolidation record corresponding to the particular order for items.

30. The order aggregator system of claim 26, wherein the at least one processor executing the bidirectional data parity logic is configured to leave data for the particular order for items un-updated when receiving a data record for the particular order for items reported by a derivative source of the particular order for items based upon the order consolidation record corresponding to the particular order for items.

* * * * *